United States Patent [19]

Hart

[11] Patent Number: 5,759,025
[45] Date of Patent: Jun. 2, 1998

[54] HEAT GENERATOR APPARATUS

[76] Inventor: Tom Hart, Box 83, Pine Lake, Alberta, Canada, T0M 1S0

[21] Appl. No.: 688,192

[22] Filed: Jul. 26, 1996

[51] Int. Cl.⁶ ..................................... F23D 3/24
[52] U.S. Cl. ..................... 431/320; 431/323; 431/267
[58] Field of Search .................... 431/267, 320, 431/323, 326

[56] References Cited

U.S. PATENT DOCUMENTS

| | | |
|---|---|---|
| D. 317,059 | 5/1991 | Menter . |
| 4,106,478 | 8/1978 | Higashijima . |
| 4,604,053 | 8/1986 | De La Rosa . |
| 4,611,986 | 9/1986 | Menter et al. . |
| 4,725,225 | 2/1988 | Gravitt . |
| 4,850,858 | 7/1989 | Blankenship et al. . |
| 5,193,521 | 3/1993 | Levinson et al. ............... 431/320 |
| 5,405,262 | 4/1995 | Appel ............................... 431/320 |

*Primary Examiner*—Carroll B. Dority

[57] ABSTRACT

A heat generator apparatus includes a fuel container and a quantity of fuel absorbing material contained in the fuel container. A quantity of liquid fuel is contained in the fuel container and is absorbed by the fuel absorbing material. A fuel-impervious layer is placed on top of the fuel absorbing material, and a lid is provided for the fuel container. The fuel absorbing material is a roll of toilet paper which has had its core removed. The fuel-impervious layer is a layer of aluminum foil. A circumferential band can be placed around a circumference of the roll of toilet paper for preventing the roll of toilet paper from expanding radially. A fuel-impervious bag can be used to contain the fuel absorbing material and the fuel-impervious layer, which are all contained within the fuel container. An igniter container can be attached to a top portion of the lid. A plurality of matches are contained within the igniter container.

5 Claims, 3 Drawing Sheets

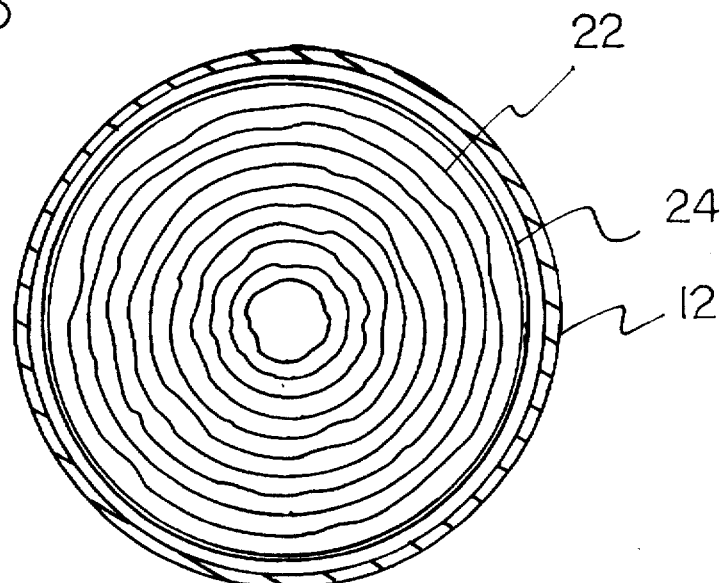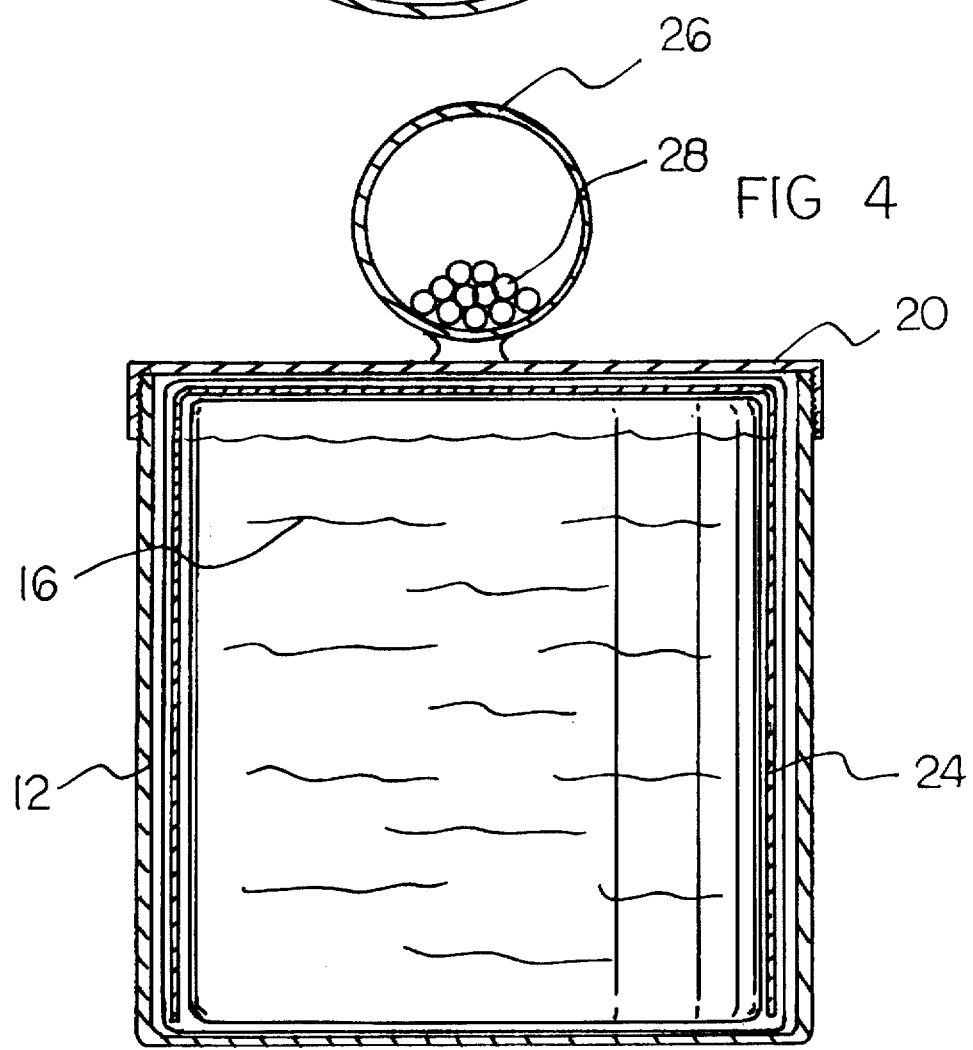

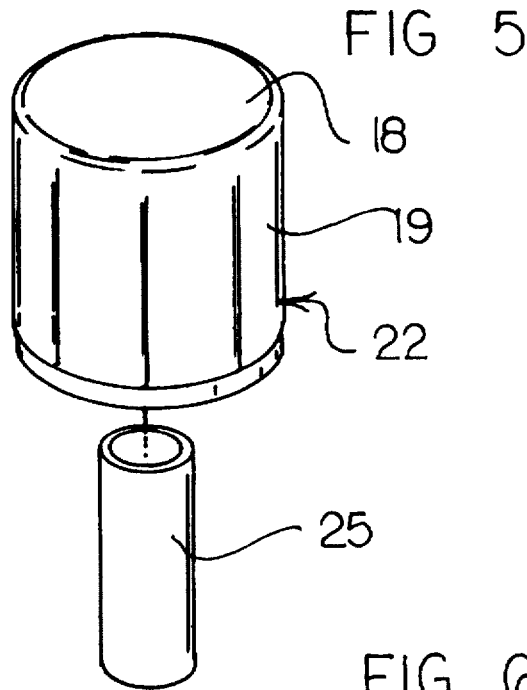
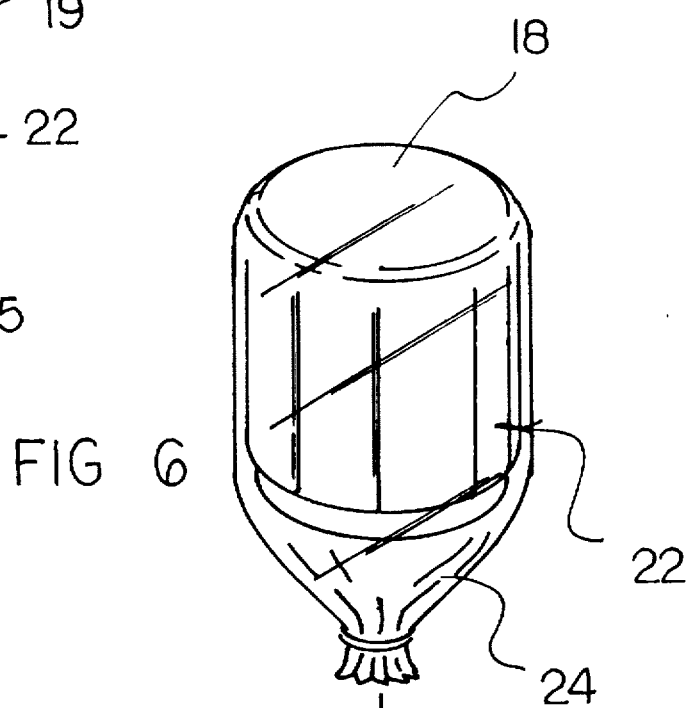
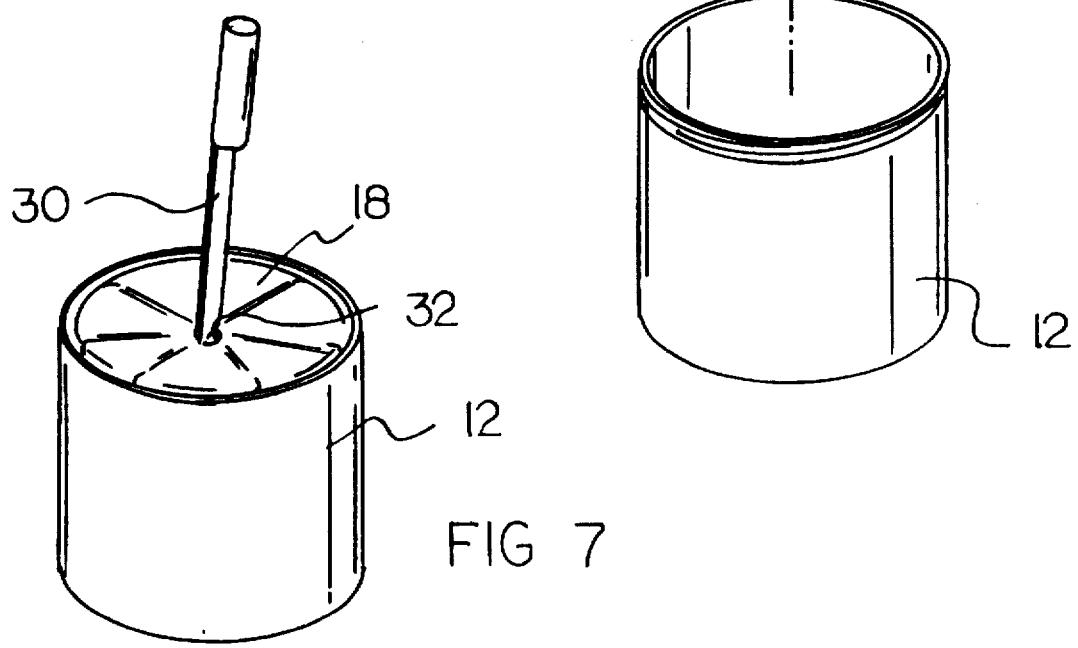

HEAT GENERATOR APPARATUS

BACKGROUND OF THE INVENTION

1. Field of the Invention

The present invention relates generally to portable heat generators and, more particularly, to portable heat generators that burn liquid fuel.

2. Description of the Prior Art

Portable heat generators that burn liquid fuels have a number uses, especially where electricity and electric heaters are not readily available. An important use of such heaters is as emergency heat sources that may be needed in wilderness areas, especially during cold temperatures, such as when a snowmobile is used. Throughout the years, a number of innovations have been developed relating to portable heat generators that use fluid fuel, and the following U. S. Pat. Nos. are representative of some of those innovations: 4,106,478, 4,604,053, 4,611,986, 4,725,225, 4,850,858, and Des. 317,059. More specifically, U. S. Pat. No. 4,106,478 discloses a packaged heat generator that uses metal powders as a fuel. Although metal powders may be fluid to some extent, they do not show capillary action, such as provided by wicks and liquid fuels. More specifically, metal powders do not flow in a direction opposite to the pull of gravity due to a wicking action. In this respect, it would be desirable if a portable heat generator were provided which employs liquid fuels and wicking action.

Each of U. S. Pat. Nos. 4,604,053, 4,611,986, and 4,725,225 discloses a heat generator that employs a liquid fuel and a relatively long, slender, flexible wick. Such a long, slender, flexible wick provides for controlling the size of the flame of the heater by adjusting the longitudinal length of the wick that projects above the level of the liquid fuel. Adjusting the longitudinal length of the wick may be inconvenient and messy. A person may have to have one's fingers contact the liquid fuel by grasping and pulling a fuel-wet wick. In this respect, it would be desirable if a portable heat generator were provided which permits adjustment of the flame without adjusting the longitudinal length of a long, slender, flexible wick.

Each of U. S. Pat. Nos. 4,850,858 and Des. 317,059 discloses a heat generator that has a top opening that has a constant, non-adjustable diameter. As a result, with heat generators disclosed in these patents, it is difficult to adjust the size of the flame. In this respect, it would be desirable if a portable heat generator were provided which has means for readily adjusting the size of the flame.

Still other features would be desirable in a heat generator device. For example, it would be desirable if a heat generator device could employ either of two common liquid fuels, methanol and kerosene. It would also be desirable if a heat generator employed a readily available material both for absorbing the liquid fuel and for providing a wick for the liquid fuel. It would also be desirable means were provided for sealing the liquid fuel supply during storage and for preventing evaporation of the liquid fuel during storage.

In order to light a heat generator device, it is most common to employ a match. However, under certain circumstances, such as out in the field, matches may not be readily available. To assure the ability to light the heat generator device, it would be desirable if the heat generator device were provided with a container that included a quantity of matches.

Thus, while the foregoing body of prior art indicates it to be well known to use portable heat generators that use liquid fuel, the prior art described above does not teach or suggest a heat generator apparatus which has the following combination of desirable features: (1) employs liquid fuels and wicking action to lift fuel against the pull of gravity; (2) permits adjustment of a flame without adjusting the longitudinal length of a long, slender, flexible wick; (3) has means for readily adjusting the size of the flame; (4) can employ common liquid fuels such as methanol and kerosene; (5) has means for sealing and for preventing evaporation of the liquid fuel during storage; and (6) has a container that includes a quantity of matches. The foregoing desired characteristics are provided by the unique heat generator apparatus of the present invention as will be made apparent from the following description thereof. Other advantages of the present invention over the prior art also will be rendered evident.

SUMMARY OF THE INVETION

To achieve the foregoing and other advantages, the present invention, briefly described, provides a heat generator apparatus which includes a fuel container and a quantity of fuel absorbing material contained in the fuel container. A quantity of liquid fuel is contained in the fuel container and is absorbed by the fuel absorbing material. A fuel-impervious layer is placed on top of the fuel absorbing material, and a lid is provided for the fuel container. The fuel absorbing material is a roll of toilet paper which has had its core removed. The fuel-impervious layer is a layer of aluminum foil. A circumferential band can be placed around a circumference of the roll of toilet paper for preventing the roll of toilet paper from expanding radially.

A fuel-impervious bag can be used to contain the fuel absorbing material and the fuel-impervious layer, which are all contained within the fuel container. An igniter container can be attached to a top portion of the lid. A plurality of matches are contained within the igniter container.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved heat generator apparatus which has all of the advantages of the prior art and none of the disadvantages.

It is another object of the present invention to provide a new and improved heat generator apparatus which may be easily and efficiently manufactured and marketed.

It is a further object of the present invention to provide a new and improved heat generator apparatus which is of durable and reliable construction.

An even further object of the present invention is to provide a new and improved heat generator apparatus which is susceptible of a low cost of manufacture with regard to both materials and labor, and which accordingly is then susceptible of low prices of sale to the consuming public, thereby making such heat generator apparatus available to the buying public.

Still yet a further object of the present invention is to provide a new and improved heat generator apparatus which employs liquid fuels and wicking action to lift fuel against the pull of gravity.

Still another object of the present invention is to provide a new and improved heat generator apparatus that permits adjustment of a flame without adjusting the longitudinal length of a long, slender, flexible wick.

Yet another object of the present invention is to provide a new and improved heat generator apparatus which has means for readily adjusting the size of the flame.

Even another object of the present invention is to provide a new and improved heat generator apparatus that can employ common liquid fuels such as methanol and kerosene.

Still a further object of the present invention is to provide a new and improved heat generator apparatus which has means for sealing and for preventing evaporation of the liquid fuel during storage.

Yet another object of the present invention is to provide a new and improved heat generator apparatus that has container that includes a quantity of matches.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 2 is a perspective view of the embodiment of the heat generator apparatus shown in FIG. 1 with the cover on.

FIG. 3 is a cross-sectional view of the embodiment of the heat generator apparatus of FIG. 1 taken along line 3—3 thereof.

FIG. 4 is an enlarged cross-sectional view of the embodiment of the invention shown in FIG. 2 taken along line 4—4 thereof.

FIG. 5 is an illustration of carrying out a step for assembling the heat generator apparatus of the invention, wherein a hollow cylindrical core is removed from a roll of toilet paper.

FIG. 6 is an illustration of carrying out a step for assembling the heat generator apparatus of the invention, wherein a de-cored roll of toilet paper having a top layer of foil is contained in a plastic bag and inserted into a can.

FIG. 7 is an illustration of carrying out a step for adjusting the size of the flame of the heat generator apparatus of the invention, wherein a hole is punched in the top layer of foil.

DESCRIPTION OF THE PREFERRED EMBODIMENT

Figure 1:
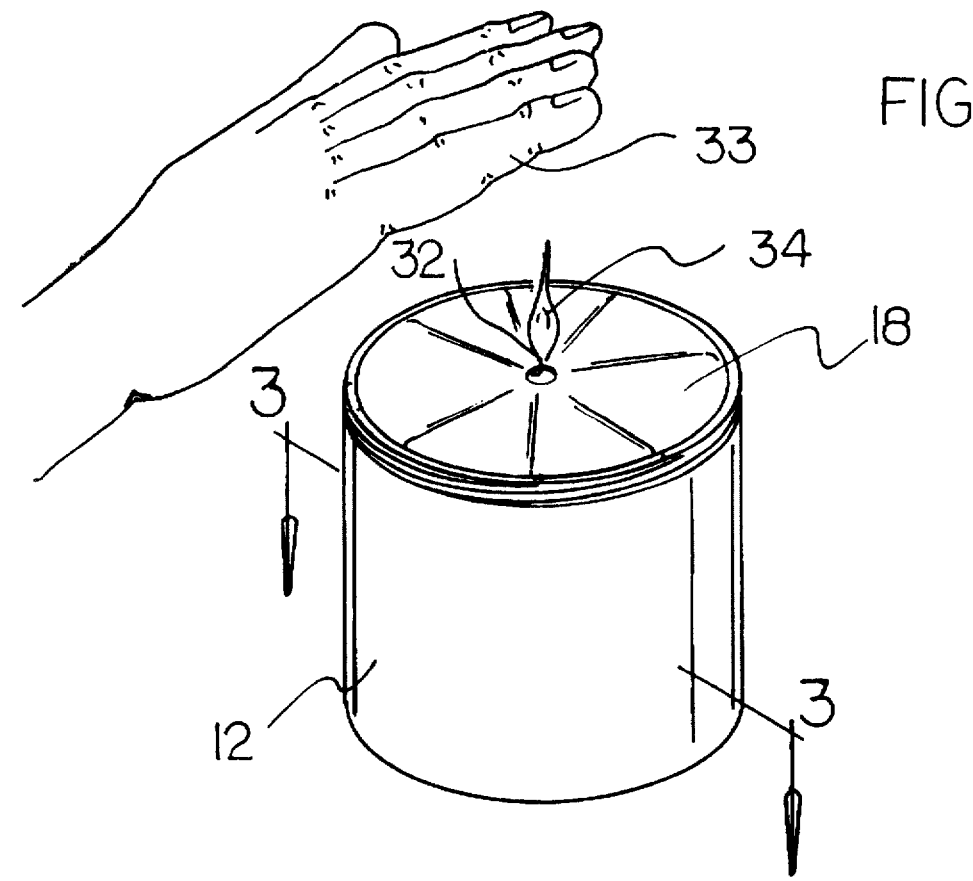
FIG. 1 is a perspective view showing a preferred embodiment of the heat generator apparatus of the invention in use with the cover off and warming a person's hand.

With reference to the drawings, a new and improved heat generator apparatus embodying the principles and concepts of the present invention will be described.

Turning to FIGS. 1–7, there is shown an exemplary embodiment of the heat generator apparatus of the invention generally designated by reference numeral 10. In its preferred form, heat generator apparatus 10 includes a fuel container 12 and a quantity of fuel absorbing material contained in the fuel container 12. A quantity of liquid fuel 16 is contained in the fuel container 12 and is absorbed by the fuel absorbing material. A fuel-impervious layer is placed on top of the fuel absorbing material, and a lid 20 is provided for the fuel container 12. As shown in FIG. 4, the fuel container 12 and the lid 20 have complementary threads. The fuel absorbing material is a roll of toilet paper 22 which has had its core 25 removed. The fuel-impervious layer is a layer of aluminum foil 18. A circumferential band 19 can be placed around a circumference of the roll of toilet paper 22 for preventing the roll of toilet paper 22 from expanding radially.

A fuel-impervious bag 24 can be used to contain the fuel absorbing material and the fuel-impervious layer, which are all contained within the fuel container 12. An igniter container 26 can be attached to a top portion of the lid 20. A plurality of matches 28 are contained within the igniter container 26.

Figure 2:
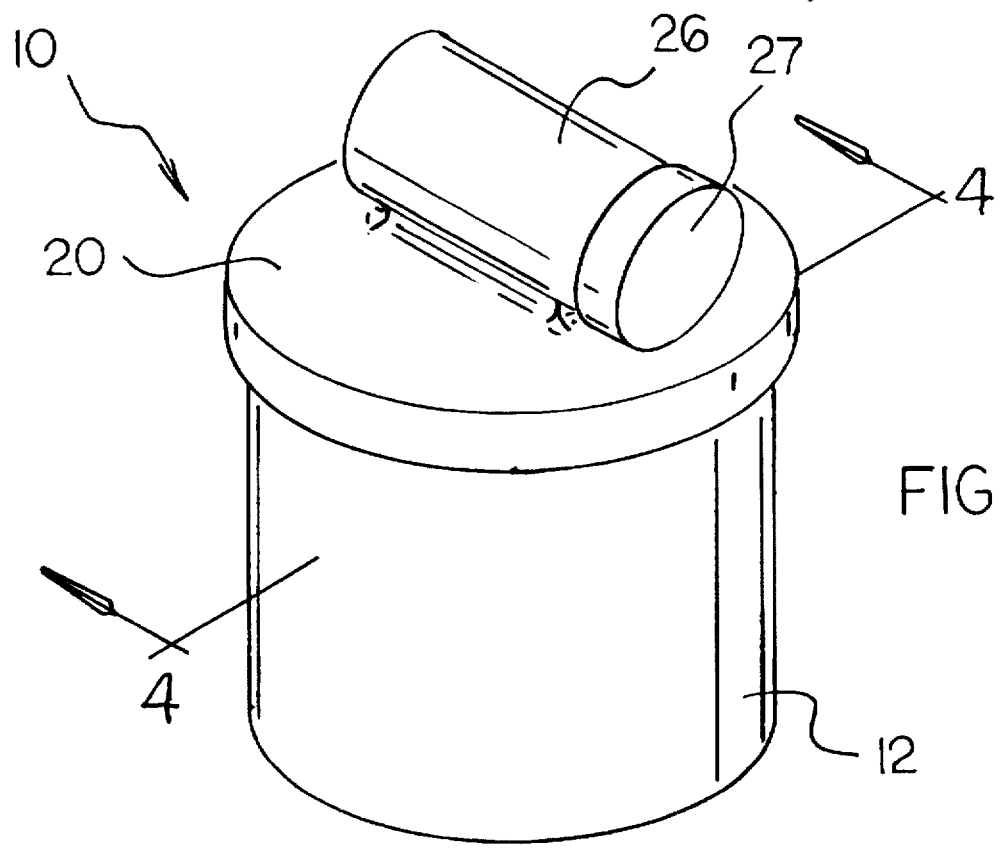

In assembling the heat generator apparatus 10 of the invention, the core 25 of roll of toilet paper 22 is removed from the roll of toilet paper 22 as shown in FIG. 5. A layer of aluminum foil 18 is placed on top of the roll of toilet paper 22, also shown in FIG. 5. A circumferential band 19 can be placed around the roll of toilet paper 22, as shown in FIG. 5. The roll of toilet paper 22 is soaked with a liquid fuel 16, which may be, for example, methanol or kerosene. If desired, as shown in FIG. 6, a fuel-impervious bag 24 receives both the fuelsoaked roll of toilet paper 22 and the layer of aluminum foil 18. The fuelimpervious bag 24 with its contents can be stored in the fuel container 12. Also, with the apparatus of the invention in storage, the lid 20 is placed on top of the fuel container 12 and its contents, as shown in FIG. 2.

To use the heat generator apparatus 10 of the invention, the lid 20 is removed from the fuel container 12. The fuel-impervious bag 24 is removed from the fuel-soaked roll of toilet paper 22 and the layer of aluminum foil 18, as shown in FIG. 6. Then, an implement 30 is used to break a flame aperture 32 in the layer of aluminum foil 18. The diameter of the flame aperture 32 determines the size of the flame 34 that forms when the liquid fuel 16 is ignited by a source of ignition such as a match 28. As shown in FIG. 1, the liquid fuel 16 has been ignited, and a flame 34 burns out from the flame aperture 32. A person is warming one's hand 33 over the flame 34. It is noted that the top surface of the roll of toilet paper 22 serves as a wick for the liquid fuel 16.

As shown in FIG. 4, a plurality of matches 28 are contained within the igniter container 26. The igniter container 26 has an igniter container lid 27 for retaining the matches 28 within the igniter container 26 in a dry manner. The igniter container 26 can be welded or adhered with an adhesive to the lid 20 on the fuel container 12.

With one embodiment of the invention that has been built, for a flame aperture 32 of one-half inch diameter, and for a liquid fuel 16 of methanol, the heat generator apparatus 10 burned for 64 hours. With another embodiment of the invention that has been built, for a flame aperture 32 of one-half inch diameter, and for a liquid fuel 16 of kerosene, the heat generator apparatus 10 burned for 92 hours.

It is noted that during use of the heat generator apparatus 10 of the invention, the size of the flame 34 can be adjusted as desired. That is, as the flame 34 is burning, the size of the flame aperture 32 can be adjusted, thereby adjusting the size of the flame 34.

When the heat generator apparatus 10 of the invention is monitored properly, substantially only the liquid fuel 16 is consumed by combustion. Once the roll of toilet paper 22 is nearly depleted of liquid fuel 16, the flame can be extinguished. Then, more liquid fuel 16 can be added to the roll of toilet paper 22. Eventually, if the roll of toilet paper 22 deteriorates or is burned, the roll of toilet paper 22 can be replaced along with a new layer of aluminum foil 18.

The non-combustible components of the heat generator apparatus of the invention can be made from inexpensive and durable metal materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved heat generator apparatus that is low in cost, relatively simple in design and operation, and which may advantageously be used with liquid fuels and a wicking action to lift fuel against the pull of gravity. With the invention, a heat generator apparatus is provided which permits adjustment of a flame without adjusting the longitudinal length of a long, slender, flexible wick. With the invention, a heat generator apparatus is provided which has means for readily adjusting the size of the flame. With the invention, a heat generator apparatus is provided which can employ common liquid fuels such as methanol and kerosene. With the invention, a heat generator apparatus is provided which has means for sealing and for preventing evaporation of the liquid fuel during storage. With the invention, a heat generator apparatus is provided which has container that includes a quantity of matches.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by tile claims, nor is it intended to be limiting as to the scope of the invention in any way.

What is claimed as being new and desired to be protected by Letters Patent of the United States is as follows:

1. A heat generator apparatus, comprising:

a fuel container, a quantity of fuel absorbing material comprising a roll of toilet paper having its core removed contained in said fuel container, a quantity of liquid fuel contained in said fuel container and absorbed by said fuel absorbing material, a fuel-impervious layer placed on top of said fuel absorbing material, and a lid for said fuel containers said apparatus further including:

a circumferential band placed around a circumference of said roll of toilet paper for preventing said roll of toilet paper from expanding radially.

2. The apparatus of claim 1 wherein said fuel-impervious layer is a layer of aluminum foil.

3. A heat generator apparatus, comprising:

a fuel container, a quantity of fuel absorbing material contained in said fuel container, a quantity of liquid fuel contained in said fuel container and absorbed by said fuel absorbing material, a fuel-impervious layer placed on top of said fuel absorbing material, and a lid for said fuel container, said apparatus further including:

a fuel-impervious bag which contains said fuel absorbing material and said fuel-impervious layer and which is contained with said fuel container.

4. The apparatus of claim 1, further including:

an igniter container attached to a top portion of said lid.

5. The apparatus of claim 6, further including:

a plurality of matches contained within said igniter container.

* * * * *